W. PURSELL.
Improvement in Axles for Vehicles.
No. 132,859.                    Patented Nov. 5, 1872.
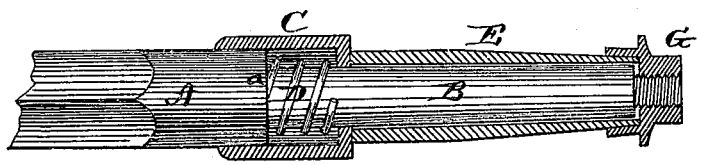
Witness:                                       Inventor.

UNITED STATES PATENT OFFICE.

WILLIAM PURSELL, OF PRINCETON, INDIANA.

IMPROVEMENT IN AXLES FOR VEHICLES.

Specification forming part of Letters Patent No. 132,859, dated November 5, 1872.

*To all whom it may concern:*

Be it known that I, WM. PURSELL, of Princeton, in the county of Gibson and in the State of Indiana, have invented certain new and useful Improvements in Axle for Vehicles; and do hereby declare that the following is a full, clear, and exact description thereof, reference being had to the accompanying drawing and to the letters of reference marked thereon making a part of this specification.

The nature of my invention consists in a sleeve placed around the inner end of the wheel-spindle, with a spring pressing the same against the hub of the wheel for the purpose of relieving the wheel at the hub when making curves or passing small obstructions, keeping the wheel to its place and preventing rattle or noise, without undue friction between the tap and the shoulder, as will be hereinafter more fully set forth.

In order to enable others skilled in the art to which my invention appertains to make and use the same, I will now proceed to describe its construction and operation, referring to the annexed drawing, which represents a side view of a wagon-axle, showing the sleeve, thimble, and tap in longitudinal section.

A represents the main part of the axle with the spindle B. C represents a sleeve loosely fitted upon the outer end of the axle and extending beyond the shoulder $a$. The outer end of this sleeve has an inner projecting circumferential flange which encircles the spindle B, and its outer surface rests against the inner surface or edge of the thimble E, as shown. Between the inner surface of the flange of the sleeve and the shoulder $a$ of the axle a recess is thus formed. Around the spindle B in this recess is placed a coil-spring, D, which bears against the flange of the collar and the shoulder on the axle. E represents the thimble upon which the wheel is placed, and fastened by the tap G, the wheel being thus held between said tap and the outer end of the sleeve C. The sleeve C being yielding on account of the spring D relieves the wheel at the hub when making curves or passing small obstructions. It also keeps the wheel to its place and prevents rattle or noise, without the amount of friction it would have if the wheel were held between the tap and a rigid shoulder on the axle.

I do not broadly claim the employment of one or more springs in connection with an axle-spindle and its thimble for relieving the wheel at the hub when making curves.

Having thus fully described my invention, what I claim as new, and desire to secure by Letters Patent, is—

The combination of the axle A with shoulder $a$, spindle B, thimble E loosely fitting in flanged sleeve C, and coil-spring D, all constructed and operating substantially as set forth.

In testimony that I claim the foregoing I have hereunto set my hand this 27th day of July, 1872.

WM. PURSELL.

Witnesses:
 A. L. DOWNEY,
 WM. D. DOWNEY.